(12) United States Patent
Lee et al.

(10) Patent No.: US 9,135,859 B2
(45) Date of Patent: Sep. 15, 2015

(54) ORGANIC LIGHT-EMITTING DIODE DISPLAY FOR MINIMIZING POWER CONSUMPTION IN STANDBY MODE, CIRCUIT AND METHOD FOR DRIVING THEREOF

(71) Applicant: LG Display Co., Ltd., Seoul (KR)

(72) Inventors: BuYeol Lee, Goyang-si (KR); SungHoon Kim, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 49 days.

(21) Appl. No.: 13/875,547

(22) Filed: May 2, 2013

(65) Prior Publication Data

US 2013/0293600 A1      Nov. 7, 2013

(30) Foreign Application Priority Data

May 2, 2012   (KR) .................. 10-2012-0046490

(51) Int. Cl.
G09G 3/32      (2006.01)
H04N 1/00      (2006.01)
G06F 1/32      (2006.01)

(52) U.S. Cl.
CPC ............ *G09G 3/3258* (2013.01); *G06F 1/3265* (2013.01); *G09G 3/3225* (2013.01); *H04N 1/00896* (2013.01); *G09G 3/3233* (2013.01); *G09G 3/3291* (2013.01); *G09G 2300/0842* (2013.01); *G09G 2310/0297* (2013.01); *G09G 2330/021* (2013.01)

(58) Field of Classification Search
CPC . G06F 1/3265; G06F 1/3218; H04N 1/00896; G09G 2330/021; G09G 2330/022; G09G 3/3258; G09G 3/3225; G09G 3/3233; G09G 3/3291; G09G 2300/0842; G09G 3210/0297
USPC .......................................................... 345/77
See application file for complete search history.

(56) References Cited

U.S. PATENT DOCUMENTS

| | | | |
|---|---|---|---|
| 2005/0030270 A1* | 2/2005 | Miyata et al. | 345/87 |
| 2011/0018858 A1* | 1/2011 | Ryu et al. | 345/213 |
| 2011/0084954 A1* | 4/2011 | Lee et al. | 345/212 |
| 2011/0084958 A1* | 4/2011 | Choi et al. | 345/213 |
| 2011/0141089 A1 | 6/2011 | Lee | |
| 2011/0193892 A1 | 8/2011 | Eom | |
| 2012/0001950 A1 | 1/2012 | Kim | |
| 2012/0119073 A1* | 5/2012 | Kurokawa et al. | 250/214.1 |

FOREIGN PATENT DOCUMENTS

| | | |
|---|---|---|
| CN | 102044214 A | 5/2011 |
| CN | 102314830 A | 1/2012 |

* cited by examiner

*Primary Examiner* — Larry Sternbane

(74) *Attorney, Agent, or Firm* — Birch, Stewart, Kolasch & Birch, LLP

(57) ABSTRACT

According to the present invention, there is discussed an organic light-emitting diode display device. More particularly, the present invention relates to an organic light-emitting diode display device for minimizing power consumption in a standby mode in which no images are displayed but not in a normal mode in which typical images are displayed, and a driving circuit and method thereof. An organic light-emitting diode according to an embodiment of the present invention may control a drain-source voltage ($V_{DS}$) of the drive transistor provided in the pixel, thereby having an effect of capable of minimizing power consumption when in a standby mode.

19 Claims, 4 Drawing Sheets

ORGANIC LIGHT-EMITTING DIODE DISPLAY FOR MINIMIZING POWER CONSUMPTION IN STANDBY MODE, CIRCUIT AND METHOD FOR DRIVING THEREOF

CROSS-REFERENCE TO RELATED APPLICATIONS

This application claims the benefit of Korean Patent Application No. 10-2012-0046490, filed on May 2, 2012, which is hereby incorporated by reference for all purposes as if fully set forth herein.

BACKGROUND OF THE INVENTION

1. Field of the Invention

The present invention relates to an organic light-emitting diode, and more particularly, to an organic light-emitting diode display device for minimizing power consumption in a standby mode in which no images are displayed but not in a normal mode in which typical images are displayed, and a driving circuit and method thereof.

2. Description of the Related Art

Flat panel display devices for replacing the existing cathode ray tube display devices may include liquid crystal displays, field emission displays, plasma display panels, organic light-emitting diode (OLED) displays, and the like.

Of them, the organic light-emitting diode may have high brightness and low operation voltage characteristics, and have a high contrast ratio because of being operated as a self luminous type display that spontaneously emits light, and allow the implementation of a ultra-thin display. Furthermore, the organic light-emitting diode has advantages such as facilitating the implementation of moving images using a response time of several microseconds (μs), having no limitation in viewing angle, having stability even at low temperatures.

The organic light-emitting diode having such characteristics can be largely divided into a passive matrix type and an active matrix type, and in the passive matrix type, a device may be configured with a matrix form in which the gate and data lines are crossed with each other. Accordingly, for the passive matrix type, the gate lines are sequentially driven as time passes to drive each pixel, and thus instantaneous brightness as much as average brightness multiplied by the number of lines may be required to display the average brightness.

However, the active matrix type has a structure in which thin-film transistors, which are switching devices for turning on or off a pixel, are located for each sub-pixel. Here, a first electrode connected to the thin-film transistor may be turned on or off in the unit of sub-pixel, and a second electrode facing the first electrode may become a common electrode.

Further, in the active matrix type, a voltage applied to the pixel may be charged at a storage capacitance (CST), and applied until the next frame signal is applied and thus continuously driven for one frame regardless of the number of gate lines. Accordingly, the same brightness can be obtained even if a low current is applied, thereby having an advantage of providing low power consumption and large screen sized display, and thus in recent years, active matrix type organic light-emitting diodes have been widely used.

On the other hand, the operation mode of the display device may include a normal mode in which typical images are displayed and a standby mode in which all power sources other than the input stage for receiving an input signal are cut off by a viewer's remote control manipulation.

Of them, when driven in a standby mode, in case that the entire screen is displayed with a simple black screen, a wall surface provided with the display device may be covered with huge black color, and thus it may not only deteriorate the surrounding environment from a visual point of view but also may be not preferable from an aesthetic point of view.

Accordingly, in order to overcome the foregoing disadvantages and implementing an interior function, a method of implementing a predetermined image such as an electronic picture frame to be repeated for a long period of time has been proposed, but it consumes the same power as in a normal mode and thus has a limit in which there is no advantage in reducing power consumption.

In order to overcome such a limit, a method of displaying a low brightness single pattern other than a simple black screen when in a standby mode has been proposed, but it is difficult to expect a large reduction effect on power consumption compared to that of a normal mode.

As an example, in case of the foregoing active matrix type organic light-emitting diode, a power of about 70 watts may be consumed when implementing a full white single pattern with 100 nits on a 55-inch display. When it is converted into a power consumption amount in a low brightness single pattern in a standby mode, a minimum power consumption of 7 watts may be generated even if it is a visible brightness of 10 nits for viewers.

SUMMARY OF THE INVENTION

An object of the present invention is to provide an organic light-emitting diode display device for minimizing power consumption in a standby mode of an active matrix type organic light-emitting diode, and a driving circuit and method thereof.

In order to accomplish the foregoing object, an organic light-emitting diode display device according to a preferred embodiment of the present invention may include a display panel formed with pixels connected to at least a first and a second line; a timing controller comprising a mode selector configured to output a selection signal defining a first and a second drive mode; a power unit configured to supply a first and a second voltage; and a data driving unit configured to output the first voltage and a data voltage to the first and the second line, respectively, when in the first drive mode, and output the second voltage and first voltage to the first and the second line, respectively, when in the second drive mode.

The second drive mode may be a standby mode in which the pixels display a low gradation single pattern of 1 to 10 nits.

The pixel may include a light-emitting diode, an anode of which is connected to a first node, and a cathode of which is grounded; a switching transistor, a gate terminal of which is connected to a third line, a drain terminal of which is connected to the second line, and a source terminal of which is connected to a second node; a drive transistor, a gate terminal of which is connected to the second node, a drain terminal of which is connected to the first line, and a source terminal of which is connected to the first node; and a capacitor, both terminals of which are connected to the first and the second node, respectively.

The second voltage may be determined within a linear region according to a change of drain-source voltage ($V_{DS}$) of the drive transistor.

The data driving unit may include an image signal control circuit configured to sort and convert an image signal supplied from the timing controller into the data voltage; and an output control circuit configured to selectively output at least two of the data voltage, first voltage and second voltage through the first and the second line in response to the selection signal.

The output control circuit may include a first switch configured to output either one of the data voltage and second voltage in response to the selection signal; a second-first switch configured to output a voltage outputted from the first switch to either one of the first and the second line in response to the selection signal; and a second-second switch configured to output the first voltage to the remaining one of the first and the second line.

The first voltage may be determined to be equal to or greater than 15 V and equal to or less than 20 V.

The first voltage may be a power voltage (ELVDD).

In order to accomplish the foregoing object, there is provided a driving circuit of an organic light-emitting diode display device according to a preferred embodiment of the present invention having a plurality of pixels provided with at least one drive transistor in which a light-emitting diode, a first line and a second line are electrically connected to a source terminal, a gate terminal and a drain terminal thereof, respectively, and the driving circuit may include a first switch configured to output either one of a data voltage and a standby power voltage in response to a selection signal defining a drive mode; a second-first switch configured to output a voltage outputted from the first switch to either one of the first and the second line; and a second-second switch configured to output a power voltage to the remaining one of the first and the second line.

The first switch may output the data voltage when in a first drive mode, and output the standby power voltage when in a second drive mode.

The second-first and the second-second switch may output the data voltage and power voltage to the first and the second line, respectively, when in the first drive mode, and output the power voltage and standby power voltage to the first and the second line when in the second drive mode.

The standby power voltage maybe determined within a linear region according to a change of drain-source voltage ($V_{DS}$) of the drive transistor.

In order to accomplish the foregoing object, a driving method of an organic light-emitting diode display device according to a preferred embodiment of the present invention may include outputting a power voltage and a data voltage to a first and a second line, respectively, formed on a display panel when in a first drive mode; and outputting a standby power voltage and a power voltage to the first and the second line, respectively, when in a second drive mode.

The second drive mode may be a standby mode in which the display panel displays a low gradation single pattern of 1 to 10 nits.

Said outputting a power voltage and a data voltage to a first and a second line, respectively, formed on a display panel when in a first drive mode may include selecting a data voltage between the power voltage and data voltage in response to the selection signal; applying the data voltage to the first line between the first and the second line in response to the selection signal; and applying the power voltage to the second line.

Said outputting a power voltage and a standby power voltage to the first and the second line, respectively, formed on the display panel when in a second drive mode may include selecting a power voltage between the power voltage and data voltage in response to the selection signal; applying the power voltage to the first line between the first and the second line in response to the selection signal; and applying the standby power voltage to the second line.

The standby power voltage may be determined within a linear region according to a change of drain-source voltage ($V_{DS}$) of the drive transistor, a gate terminal and a drain terminal of which are electrically connected to a first and a second line, respectively.

An organic light-emitting diode display device according to a preferred embodiment of the present invention, and a driving circuit and method thereof may control a drain-source voltage ($V_{DS}$) of the drive transistor provided in the pixel, thereby having an effect of capable of minimizing power consumption when in a standby mode.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Hereinafter, an organic light-emitting diode, a driving circuit and method thereof according to a preferred embodiment of the present invention will be described below with reference to the accompanying drawings.

An organic light-emitting diode according to an embodiment of the present invention may be operated in a normal mode in which typical images are displayed and a standby mode in which only minimum power is applied to each constituent element including an input stage for receiving an input signal by a viewer's remote control manipulation.

Figure 1:
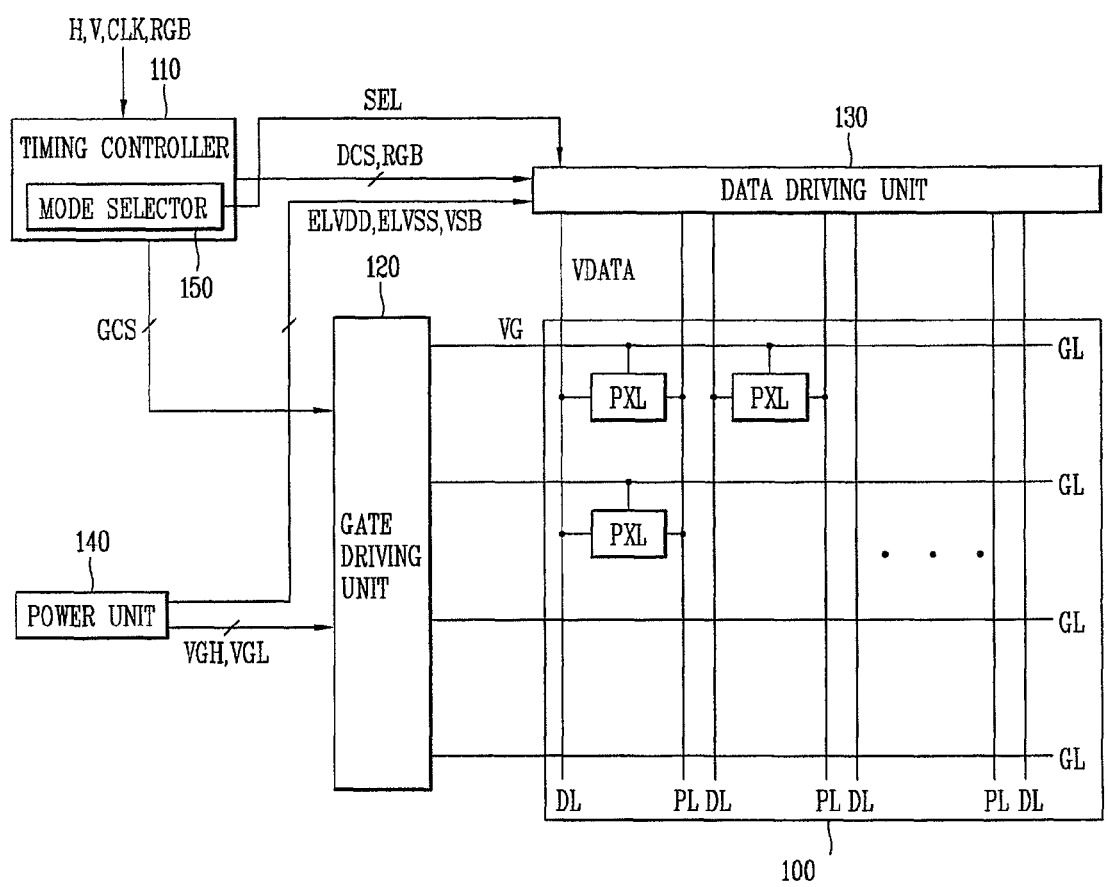
FIG. 1 is a view illustrating the entire structure of a display device to which an organic light-emitting diode according to an embodiment of the present invention is applied.

FIG. 1 is a view illustrating the entire structure of a display device to which an organic light-emitting diode according to an embodiment of the present invention is applied.

As illustrated in the drawing, an organic light-emitting diode display device according to the present invention may include a display panel 100 configured to implement an image, a timing controller 110 configured to receive various signals from an external system to generate a control signal and sort and convert an image signal, a gate driving unit 120 configured to generate a gate driving voltage (VG) and a data driving unit 130 configured to generate a data voltage (VDATA) according to the control of the timing controller 110, and a power unit 140 configured to supply a power voltage and other driving voltages.

A plurality of gate lines (GLs) and a plurality of data lines (DLs) are formed on the display panel 100 in a matrix form. The gate lines (GLs) are connected to the gate driving unit 120, and the data lines (DLs) are connected to the data driving unit 130, and a pixel (PXL) is defined at each cross position of the lines.

Furthermore, the pixel (PXL) is connected to a power supply line (PL) connected to an output stage of the data driving unit 130. Though not shown in the drawing, each pixel (PXL) is also connected to a line (not shown) for supplying the ground voltage (ELVSS).

Each pixel (PXL) may include at least one or more thin film transistors (TFTs), organic light-emitting diodes (OLEDs), and capacitors.

According to such a structure, on the display panel 100, a thin film transistor is conducted in response to a signal received at each line, and a data voltage (VDATA) according to gradation is applied to each pixel, and a current corresponding to the data voltage (VDATA) flows through the organic light-emitting diode (OLED), thereby implementing an image.

The timing controller 110 receives data (RGB) for an image to be displayed, a horizontal synchronization signal (H), a vertical synchronization signal (V) and a clock signal (CLK) for controlling each driving unit from an external system including a plurality of video chips, video controller and CPU, and the like.

The timing controller 110 generates various control signals for driving the gate driving unit 120 and data driving unit 130 which will be described later to supply them to each driving unit 120, 130 in response to the timing signals supplied from the external system.

The gate driving unit 120 supplies a gate driving voltage (VG) to a plurality of pixels (PXLs) arranged on the display panel 100 in response to a gate control signal (GCS) received from the timing controller 110. The output stage of the gate driving unit 120 is connected to the gate line (GL) of the display panel 100, and outputs the gate driving voltage (VG) through this to sequentially turn on a switching transistor provided at the pixel (PXL) for each horizontal period (1H), thereby allowing the data voltage (VDATA) outputted from the data driving unit 130 to the display panel 100 to be applied to each pixel (PXL).

The data driving unit 130 sorts image data (RGB) received in response to the data control signal (DCS) received from the timing controller 110, and selects a reference voltage corresponding to the image data to convert it into a data voltage in an analog form. The data voltage is latched for each one horizontal period (1H), and supplied to the display panel 100 through all the data lines (DLs) at the same time.

Furthermore, the data driving unit 130 applies different levels of voltages to the data line (DL) and power supply line (PL) when the display panel 100 is driven in a normal mode or standby mode according to the control of the mode selector 150 which will be described later, and an output control circuit (not shown) for this is incorporated therein.

The power unit 140 performs the role of supplying a driving voltage and a reference voltage to the gate and data driving units 120, 130. The driving voltage may include a gate high voltage (VGH) and a gate low voltage (VGL) of the gate driving voltage (VG), a power voltage (ELVDD) and a ground voltage (ELVSS) of the organic light-emitting diode (OLED), and the like. In particular, the power unit 150 of this invention may further include a standby power voltage (VSB) for reducing a current ($I_{DS}$) flowing through the light-emitting diode, which substitutes the power voltage (ELVDD) on the pixel (PXL) in a standby mode.

The mode selector 150 controls the driving unit to determine a current drive mode of the display device, and display a screen corresponding to the image data according to a typical driving method when in a normal mode, and display arbitrary monochrome gradation other than black gradation which consumes the minimum power to be distinguished from that of the normal mode when in a standby mode.

The mode selector 150 is in a disable state in a normal mode, and the timing controller 110 controls the gate driving unit 120 according to the timing signals supplied from the external system to generate a gate driving voltage and enable the pixel on the display panel 100 while at the same time sorting and converting the image signal into a data voltage to supply it to the pixel. Accordingly, the display panel 100 implements an image.

At this time, the data driving unit 130 applies the data voltage (VDATA) to the data line (DL), and applies the power voltage (ELVDD) to the power supply line. Furthermore, a standby mode is a state in which the timing controller 110 is unable to receive any one of the timing signals from the external system, and the mode selector 150 may determine the drive mode of the display device according to a signal receiving state of the timing controller 110.

Accordingly, the mode selector 150 determines a current drive mode of the display device, and then outputs a high level of gate high voltage (VGH) from all the gate line (GL) to the gate driving unit 120 in case of a standby mode, thereby controlling all the pixels (PXLs) to be in an enable state.

Furthermore, the mode selector 150 applies a selection signal (SEL) for a standby mode operation to the data driving unit 130. The selection signal (SEL) is a signal for controlling signals outputted to the data line (DL) and power supply line (PL) when in a standby mode included in the data driving unit 130.

When the selection signal (SEL) is applied, the driving unit 130 applies the power voltage (ELVDD) to the data lines (DLs) connected to all the pixels (PXLs) to display monochrome gradation. Furthermore, at the same time, the standby power voltage (VSB) is applied to the power supply line (PL). It does not apply a typical power voltage (ELVDD) but applies the standby power voltage (VSB) at a voltage lower than that of the typical power voltage (ELVDD) to a drain terminal of the drive transistor controlling a current ($I_{DS}$) flowing through the organic light-emitting diode (OLED) of the pixel (PXL) to control the drain-source voltage, thereby displaying a low gradation image other than black gradation even with power driving lower than the related art in a standby mode.

Figure 2:
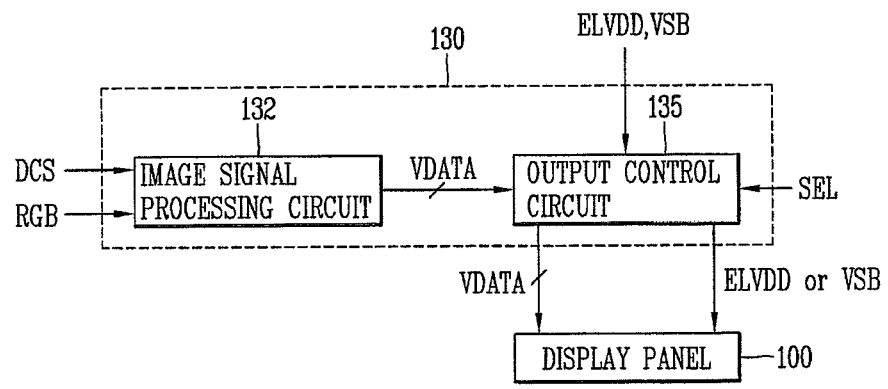
FIG. 2 is a view illustrating the structure of a data driving unit in an organic light-emitting diode display device according to an embodiment of the present invention.

FIG. 2 is a view illustrating the structure of a data driving unit in an organic light-emitting diode display device according to an embodiment of the present invention.

As illustrated in the drawing, the data driving unit of in an organic light-emitting diode display device according to the present invention may include an image signal processing circuit 132 for sorting and converting image signals and an output control circuit 135 for controlling an output voltage to the display panel 100 according to the drive mode.

The image signal processing circuit 132 receives image signals (RGB) in a digital waveform and a data control signal (DCS) from the timing controller, and outputs a data voltage (VDATA) in an analog waveform. Here, the data voltage (VDATA) is a voltage for controlling a drain-source current of the drive transistor provided in the pixel, and supplied to the output control circuit 135 embedded in the data driving unit 130.

The output control circuit 135 receives the power voltage (ELVDD) and standby power voltage (VSB) from the power unit. Furthermore, the output control circuit 135 determines a drive mode in response to a selection signal (SEL) outputted from the mode selector of the timing controller, and selectively outputs the data voltage (VDATA) received from the image signal processing circuit 132, and the power voltage (ELVDD) and standby power voltage (VSB) to the display panel 100 in a corresponding manner.

When in a normal mode, the output control circuit 135 having a such structure supplies the data voltage (VDATA) to the display panel 100 through the data line (DL), and supplies the power voltage (ELVDD) to the display panel 100 through the power supply line (PL).

Furthermore, when in an abnormal mode, the output control circuit 135 supplies the power voltage (ELVDD) other than the data voltage (VDATA) to the display panel 100 through the data line (DL), and supplies the standby power voltage (VSB) other than the power voltage (ELVDD) to the display panel 100 through the power supply line (PL).

Here, the power voltage (ELVDD) is determined as a voltage level of 15-20 V, and the standby power voltage (VSB) is a signal at a voltage level of 3.2 V.

Accordingly, a voltage of 15 to 20 V is applied to the gate terminal of the plurality of drive transistors provided in the display panel 100, and 3.2 V is applied to the drain terminal thereof in an abnormal mode.

It is because fixing a voltage of the gate terminal ($V_G$) to the level of the power voltage (ELVDD) and reducing a voltage applied to the drain terminal ($V_D$) is beneficial to reduction of power consumption, compared to applying the power voltage (ELVDD) to the drain terminal ($V_D$) of the driving thin film transistor and reducing the voltage ($V_G$) applied to the gate terminal thereof to display arbitrary low brightness gradation.

In other words, according to the present invention, a drain-source voltage ($V_{DS}$) of the drive transistor may be controlled to implement a screen in a standby mode, not by controlling a gate-source voltage ($V_{GS}$) of the drive transistor to implement arbitrary low brightness gradation in a standby mode.

Hereinafter, the structure of a driving circuit in an organic light-emitting diode according to an embodiment of the present invention will be described below through an equivalent circuit of one pixel and an output control circuit connected thereto.

FIG. 2 is a view illustrating the structure of a data driving unit provided in an organic light-emitting diode display device according to an embodiment of the present invention.

As illustrated in the drawing, the data driving unit 130 of this invention may include an image signal processing circuit 132 for sorting and converting image signals (RGB) supplied from the timing controller into a form that can be processed by the display panel 100 and an output control circuit 135 for supplying the converted image signals, namely, data voltage (VDATA), to the display panel 100 for each frame in an appropriate manner, and selectively outputting the data voltage and a voltage for driving according to the drive mode of the display device.

The image signal processing circuit 132 may include a plurality of shift registers, latches, digital-analog converters (DACs) and buffers, and the like, and sorts and converts the supplied image signals (RGB) in an analog waveform into a data voltage (VDATA) in a digital waveform according to the data control signal (DCS) supplied from the timing controller.

The output control circuit 135 receives a data voltage (VDATA) from the image signal processing circuit 132 to selectively apply it to the display panel 100 according to the drive mode of the display device. In particular, the output control circuit 135 receives a power voltage (ELVDD) and a standby power voltage (VSB) from the power unit, and applies at least two of the supplied voltages to the display panel 100 according to the selection signal outputted from the mode selector of the timing controller.

Specifically, in a normal mode, the output control circuit 135 applies a data voltage as it is supplied by the image signal processing circuit 132 to the data line (DL) connected to the display panel 100, and applies the power voltage (ELVDD) to the power supply line (PL), thereby controlling the pixel provided in the display panel 100 in a same manner as the typical driving.

On the contrary, in a standby mode, the output control circuit 135 applies the power voltage (ELVDD) to the data line (DL), and applies the standby power voltage (VSB) to the power supply line (PL). It is to control a drain-source current of the drive transistor provided in each pixel of the display panel 100 by a voltage applied to the drain terminal thereof, and thus the drain-source current can be controlled by a low level voltage when the power voltage (ELVDD) is applied to the gate terminal thereof and the standby power voltage (VSB) is applied to the drain terminal thereof, thereby reducing power consumption.

Hereinafter, the structure of an organic light-emitting diode driving circuit according to the present invention will be described through an equivalent circuit of one pixel and an output control circuit connected thereto provided in the display panel with reference to the drawing.

Figure 3:
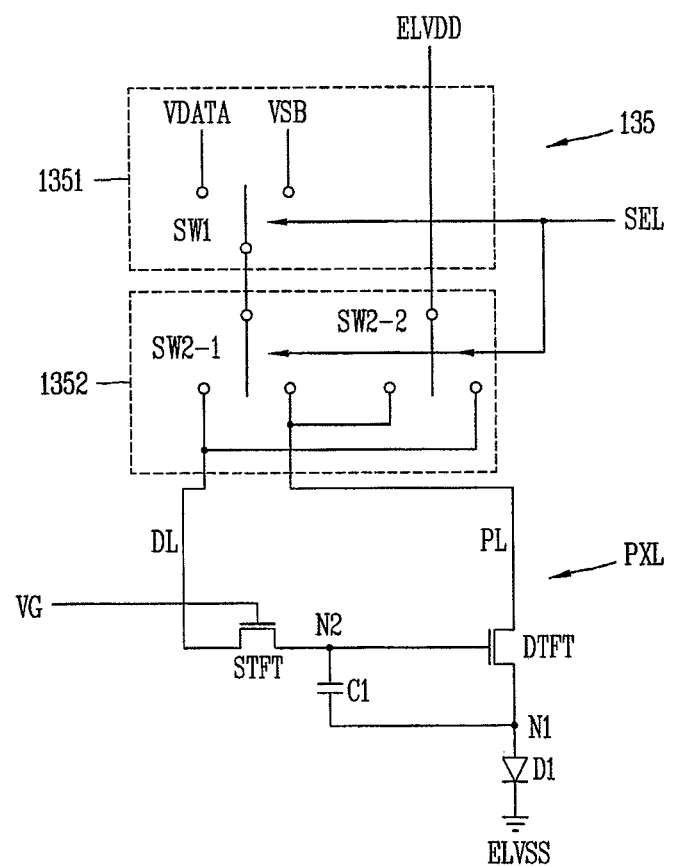
FIG. 3 is a view illustrating the structure of a driving circuit of an organic light-emitting diode according to an embodiment of the present invention and one pixel connected thereto.

FIG. 3 is a view illustrating the structure of a driving circuit of an organic light-emitting diode according to an embodiment of the present invention and one pixel connected thereto.

As illustrated in the drawing, for one pixel (PXL) in the organic light-emitting diode device according to the present invention, an anode contact type pixel driving circuit in which the drive transistor is connected to an anode of the light-emitting diode is implemented with an N-type transistor (N-TFT).

As illustrated in the drawing, one pixel (PXL) may include a light-emitting diode (D1) an anode of which is connected to a first node (N1) and a cathode of which is grounded, a capacitor (C1) both terminals of which are connected to the first and the second node (N1, N2), respectively, a switching transistor (STFT) a gate terminal of which is connected to a gate line, a drain terminal of which is connected to a data line, and a source terminal of which is connected to a second node (N2), and a drive transistor (DTFT) a gate terminal of which is connected to the second node (N2), a drain terminal of which is connected to the power supply line (PL), and a source terminal of which is connected to the first node (N1).

According to such a structure, the first node (N1) is connected between a source terminal of the switching transistor (STFT) and a gate terminal of the drive transistor (DTFT), and the second node (N2) is connected between an anode terminal of the light-emitting diode (D1) and a source terminal of the drive transistor (DTFT).

Furthermore, the output control circuit 135 of the data driving unit connected to each pixel (PXL) may include a first voltage selection stage 1351 and a second voltage selection stage 1352. The first voltage selection stage 1351 is comprised of at least one first switch (SW1), and has a structure of selectively outputting either one of the two inputs. The first switch (SW1) outputs either one of the data voltage (VDATA) and standby power voltage (VSB) to the second voltage selection stage 1352 in response to the selection signal (SEL).

The second voltage selection stage 1352 is comprised of at least two switches, such as a second-first and a second-second switch (SW2-1, SW2-2), and has a structure of outputting each one input to either one of the two output terminals. The second-first switch (SW2-1) outputs an output of the first voltage selection stage 1351 to either one of the data line (DL) and power supply line (PL), respectively, in response to the selection signal (SEL). Furthermore, the second-second switch (SW2-2) outputs the power voltage (ELVDD) to either one of the data line (DL) and power supply line (PL).

Here, the output terminals of the second-first switch (SW2-1) and second-second switch (SW2-2) share the same line, and select either one of the data line (DL) and power supply line (PL) and output their voltages such that their outputs are not overlapped with each other.

The foregoing configuration has a structure in which the data voltage (VDATA) is applied to a gate terminal of the drive transistor (DTFT) in a normal mode, thereby controlling a drain-source current of the drive transistor (DTFT) to display the gradation of an image through a current ($I_{DS}$) amount flowing through the light-emitting diode (D1).

Furthermore, in an abnormal mode, the power voltage (ELVDD) is applied to a gate terminal of the drive transistor (DTFT) to maintain a turn-on state, and applies predetermined level of standby power to a drain terminal of the drive transistor (DTFT) to control a drain-source voltage ($V_{DS}$). Consequently, according to the foregoing structure, a current ($I_{DS}$) flowing through the light-emitting diode (D1) may be operated to have a minimum brightness within a linear region according to a change of drain-source voltage ($V_{DS}$) of the drive transistor (DTFT), thereby implementing low power single pattern low gradation.

Hereinafter, a driving method of an organic light-emitting diode display device according to the present invention in each drive mode will be described according to the foregoing structure.

Figure 4:
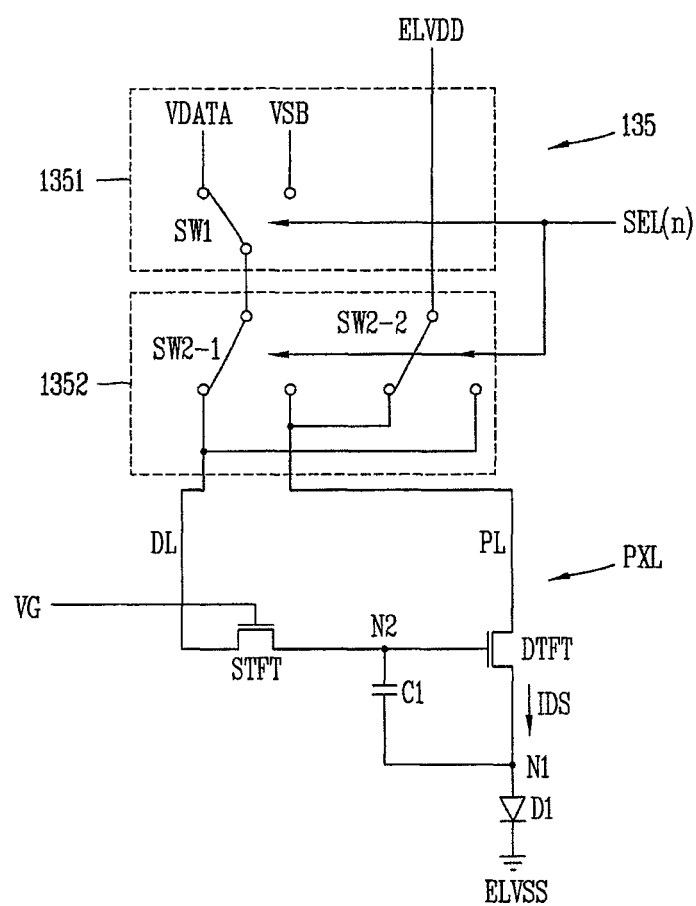
FIG. 4 is a view for explaining a driving method of an organic light-emitting diode display device according to an embodiment of the present invention when in a normal mode.

FIG. 4 is a view for explaining a driving method of an organic light-emitting diode display device according to an embodiment of the present invention when in a normal mode.

As illustrated in the drawing, when in a normal mode, the mode selector embedded in the timing controller of the organic light-emitting diode display device according to the present invention outputs a selection signal {SEL(n)}, and it is applied to each switch provided in the first and the second voltage selection stage 1351, 1352 of the output control circuit 135.

Here, the sorted and converted data voltage (VDATA) from the image signal control circuit and the standby power voltage (VSB) from the power unit are supplied to the first switch (SW1) of the first voltage selection stage 1351.

Furthermore, a voltage selected through the first switch (SW1) is supplied to the second-first switch (SW2-1) of the second voltage selection stage 1352, and the power voltage (ELVDD) is supplied to the second-second switch (SW2-2).

Accordingly, when the selection signal {SEL(n)} is applied when in a normal mode, the first switch (SW1) outputs the data voltage (VDATA) to the second voltage selection stage 1352. Next, the second-first switch (SW2-1) outputs the data voltage (VDATA) received in response to the selection signal {SEL(n)} to the data line (DL). At the same time, the second-second switch (SW2-2) outputs the power voltage (ELVDD) to the power supply line (PL).

Furthermore, when a high level of gate driving voltage (VG) is applied to the gate line according to the driving of the display device, the switching transistor (STFT) of the pixel (PXL) is conducted and thus a voltage subtracting a threshold voltage ($V_{TH}$) of the switching transistor (STFT) from the data voltage (VDATA) of the data line (DL1) is applied to the second node (N2). Furthermore, a voltage according to the second node (N2) is charged to the capacitor (C1).

At the same time, the second-second switch (SW2-2) outputs the power voltage (ELVDD) to the power supply line (PL) in response to the selection signal {SEL(n)}. Accordingly, the drive transistor (DTFT) is conducted to flow a light-emitting diode current ($I_{DS}$), and the light-emitting diode (D1) displays gradation corresponding to a gate-source voltage ($V_{GS}$).

Hereinafter, a driving method of an organic light-emitting diode display device according to an embodiment of the present invention in a standby mode will be described below.

Figure 5:
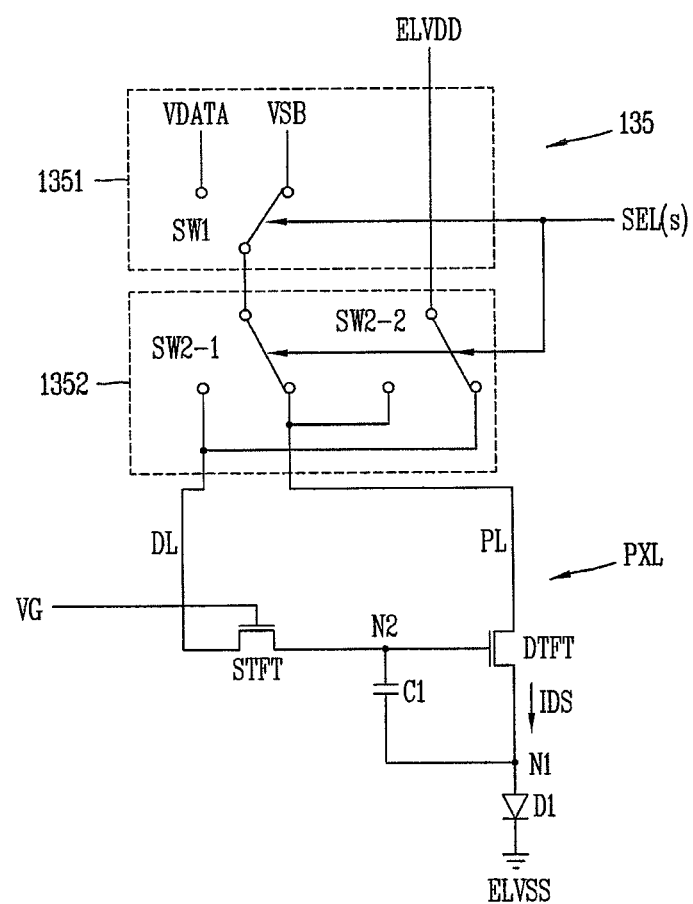
FIG. 5 is a view for explaining a driving method of an organic light-emitting diode display device according to an embodiment of the present invention when in a standby mode.

FIG. 5 is a view for explaining a driving method of an organic light-emitting diode display device according to an embodiment of the present invention when in a standby mode.

As illustrated in the drawing, when in a standby mode, the mode selector embedded in the timing controller of the organic light-emitting diode display device according to the present invention outputs a selection signal {SEL(n)}. It is applied to each switch provided in the first and the second voltage selection stage 1351, 1352 of the output control circuit 135.

Here, each voltage applied to the first and the second voltage selection stage 1351, 1352 is the same as that of the foregoing normal mode.

Accordingly, when the selection signal {SEL(n)} is applied as a standby mode, the first switch (SW1) outputs the standby power voltage (VSB) to the second voltage selection stage 1352. Next, the second-first switch (SW2-1) outputs the standby power voltage (VSB) received in response to the selection signal {SEL(n)} to the power supply line (PL). At the same time, the second-second switch (SW2-2) outputs the power voltage (ELVDD) to the data line (DL).

Furthermore, when a high level of gate driving voltage (VG) is applied to the gate line according to the driving of the display device, the switching transistor (STFT) of the pixel (PXL) is conducted and thus a voltage subtracting a threshold voltage ($V_{TH}$) of the switching transistor (STFT) from the power voltage (ELVDD) of the data line (DL1) is applied to the second node (N2). As a result, a voltage according to the second node (N2) is charged to the capacitor (C1).

At the same time, the second-second switch (SW2-2) outputs the standby power voltage (VSB) to the power supply line (PL) in response to the selection signal {SEL(n)}. Accordingly, the drive transistor (DTFT) is conducted to flow a current ($I_{DS}$) through the light-emitting diode.

At this time, the power voltage (ELVDD) is 15-20 V, and the standby power voltage (VSB) has a voltage level of 3.2 V, and when driving a low gradation signal pattern for the standby mode, power consumption of about 1.2 W is generated in case of brightness of 10 nits. As a result, when driven at the same low gradation, it can be driven with low power consumption compared to a case that the drain-source voltage ($V_{DS}$) of the drive transistor (DTFT) is fixed to be equal to or greater than 20 V, and the gate-source voltage ($V_{GS}$) is controlled at less than 2.4 V.

Although the preferred embodiments of the present invention have been described in detail, it should be understood by those skilled in the art that various modifications and other equivalent embodiments thereof can be made.

What is claimed is:

1. An organic light-emitting diode display device, comprising:
   a display panel formed with pixels connected to at least a first and a second line;
   a timing controller comprising a mode selector configured to output a selection signal defining a first and a second drive mode;
   a power unit configured to supply a first and a second voltage; and
   a data driving unit configured to output the first voltage and a data voltage to the first and the second line, respectively, when the device is in the first drive mode, and output the second voltage and first voltage to the first and the second line, respectively, when the device is in the second drive mode, wherein the data driving unit comprises an output control circuit configured to selectively output at least two of the data voltage, first voltage and second voltage through the first and the second line in response to the selection signal, and wherein the output control circuit comprises:

a first switch configured to output either one of the data voltage and second voltage in response to the selection signal;

a second-first switch configured to output the data voltage or the second voltage outputted from the first switch to either one of the first and the second line in response to the selection signal; and a second-second switch configured to output the first voltage to the remaining one of the first and the second line.

2. The organic light-emitting diode display device of claim 1, wherein the second drive mode is a standby mode in which the pixels display a low gradation single pattern of 1 to 10 nits.

3. The organic light-emitting diode display device of claim 1, wherein the pixel comprises:

a light-emitting diode, an anode of which is connected to a first node, and a cathode of which is grounded;

a switching transistor, a gate terminal of which is connected to a third line, a drain terminal of which is connected to the second line, and a source terminal of which is connected to a second node;

a drive transistor, a gate terminal of which is connected to the second node, a drain terminal of which is connected to the first line, and a source terminal of which is connected to the first node; and a capacitor, both terminals of which are connected to the first and the second node, respectively.

4. The organic light-emitting diode display device of claim 3, wherein the second voltage is determined within a linear region according to a change of drain-source voltage ($V_{DS}$) of the drive transistor.

5. The organic light-emitting diode display device of claim 3, wherein the data driving unit comprises:

an image signal control circuit configured to sort and convert an image signal supplied from the timing controller into the data voltage.

6. The organic light-emitting diode display device of claim 1, wherein the first voltage is determined to be equal to or greater than 15 V and equal to or less than 20 V.

7. The organic light-emitting diode display device of claim 1, wherein the first voltage is a power voltage (ELVDD).

8. The organic light-emitting diode display device of claim 6, wherein the first voltage is a power voltage (ELVDD).

9. A driving circuit of an organic light-emitting diode display device having a plurality of pixels provided with at least one drive transistor in which a light-emitting diode, a first line and a second line are electrically connected to a source terminal, a gate terminal and a drain terminal thereof, respectively, the driving circuit comprising:

a first switch configured to output either one of a data voltage and a standby power voltage in response to a selection signal defining a drive mode;

a second-first switch configured to output the data voltage or the standby power from the first switch to either one of the first and the second line; and a second-second switch configured to output a power voltage to the remaining one of the first and the second line.

10. The driving circuit of claim 9, wherein the first switch outputs the data voltage when the device is in a first drive mode, and outputs the standby power voltage when the device in a second drive mode.

11. The driving circuit of claim 9, wherein the second-first and the second-second switch output the data voltage and power voltage to the first and the second line, respectively, when the device is in the first drive mode, and output the power voltage and standby power voltage to the first and the second line, respectively, when the device is in the second drive mode.

12. The driving circuit of claim 9, wherein the standby power voltage is determined within a linear region according to a change of drain-source voltage ($V_{DS}$) of the drive transistor.

13. A driving method of an organic light-emitting diode display device, the driving method comprising:

outputting a power voltage and a data voltage to a first and a second line, respectively, formed on a display panel when the device is in a first drive mode; and outputting a standby power voltage and the power voltage to the first and the second line, respectively, when the device is in a second drive mode.

14. The driving method of claim 13, wherein the second drive mode is a standby mode in which the display panel displays a low gradation single pattern of 1 to 10nits.

15. The driving method of claim 13, wherein said outputting a power voltage and a data voltage to a first and a second line, respectively, formed on a display panel when the device is in a first drive mode comprises:

selecting a voltage from between the standby power voltage and the data voltage in response to the selection signal;

applying the selected voltage to the second line in response to the selection signal; and applying the power voltage to the first line.

16. The driving method of claim 15, wherein the standby power voltage is determined within a linear region according to a change of drain-source voltage ($V_{DS}$) of the drive transistor, a gate terminal and a drain terminal of which are electrically connected to a first and a second line, respectively.

17. The driving method of claim 13, wherein said outputting a standby power voltage and a power voltage to the first and the second line, respectively, formed on the display panel when the device is in a second drive mode comprises:

selecting a voltage from between the standby power voltage and the data voltage in response to the selection signal;

applying the selected voltage to the first line in response to the selection signal; and applying the power voltage to the second line.

18. The driving method of claim 17, wherein the standby power voltage is determined within a linear region according to a change of drain-source voltage ($V_{DS}$) of the drive transistor, a gate terminal and a drain terminal of which are electrically connected to a first and a second line, respectively.

19. The driving method of claim 13, wherein the standby power voltage is determined within a linear region according to a change of drain-source voltage ($V_{DS}$) of the drive transistor, a gate terminal and a drain terminal of which are electrically connected to a first and a second line, respectively.

* * * * *